(12) United States Patent
George

(10) Patent No.: US 9,124,695 B1
(45) Date of Patent: Sep. 1, 2015

(54) MOBILE INTEGRATED VOICE RESPONSE SYSTEMS

(71) Applicant: FMR LLC, Boston, MA (US)

(72) Inventor: Abraham George, Cary, NC (US)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 14/321,034

(22) Filed: Jul. 1, 2014

(51) Int. Cl.
| | |
|---|---|
| *H04M 11/00* | (2006.01) |
| *H04M 3/493* | (2006.01) |
| *H04W 4/12* | (2009.01) |
| *G06F 3/0482* | (2013.01) |
| *G06F 3/0484* | (2013.01) |
| *H04W 12/06* | (2009.01) |

(52) U.S. Cl.
CPC ............ *H04M 3/493* (2013.01); *G06F 3/0482* (2013.01); *G06F 3/04842* (2013.01); *H04W 4/12* (2013.01); *H04W 12/06* (2013.01)

(58) Field of Classification Search
CPC ............ H04M 3/5307; H04M 2201/60; H04L 12/589
USPC .................. 379/88.01, 88.13, 93.17; 704/275
See application file for complete search history.

(56) References Cited

U.S. PATENT DOCUMENTS

| | | | | |
|---|---|---|---|---|
| 6,885,737 | B1 * | 4/2005 | Gao et al. ................... | 379/93.17 |
| 6,920,425 | B1 * | 7/2005 | Will et al. ..................... | 704/275 |
| 2003/0112948 | A1 * | 6/2003 | Brown et al. ............ | 379/207.04 |
| 2011/0286586 | A1 * | 11/2011 | Saylor et al. ............... | 379/88.13 |

* cited by examiner

*Primary Examiner* — Fan Tsang
*Assistant Examiner* — Van D Huynh
(74) *Attorney, Agent, or Firm* — Gesmer Updegrove LLP

(57) ABSTRACT

An interactive voice response system is provided that includes a voice response platform that receives incoming calls and provide an interactive voice response service to a calling party. A mobile application executes on a processor that issues a call to the voice response platform. The voice response platform determines whether or not the calling party is a mobile device. If the calling party is a mobile device, the voice response platform sends a translation of a voice menu back to the mobile device to be displayed as a visual (GUI) representation of a voice menu on the mobile device. The visual representation could also be stored on the mobile device to avoid the translation from the voice menu.

14 Claims, 4 Drawing Sheets

MOBILE INTEGRATED VOICE RESPONSE SYSTEMS

BACKGROUND OF THE INVENTION

The present invention is generally related to telecommunications and more particularly to the integration of interactive voice response (IVR) system with mobile applications.

The IVR system typically interacts with a calling party over the telephone network through dual tone multi-frequency (DTMF) of DTMF signaling in the public switched telephone network (PSTN).

IVR systems in particular have allowed telephone service providers to efficiently host call centers for business customers. An IVR system may be used to dispense or collect information from callers, including authentication and authorizing callers, pre-classifying calls, thus allowing service representatives to specialize in particular areas, cutting down on the need for live call center representatives to receive and route calls properly. In many scenarios, the entire call may take place over the IVR system, without the need for interaction with a service representative.

However, though these IVR systems may improve efficiency for the employees of the service provider, these systems are often frustrating for the user who may become stranded or confused in the IVR system. The user may not know how to return to the previous menu after choosing the wrong menu, or the user may not know how to replay a menu after missing a choice. Moreover, the voice menu may seem endless to the calling party because the calling party has no idea at what point he or she will reach a service representative or accomplish the intended objective. Therefore, there is a need for systems and method that address these and/or other perceived shortcomings of the prior art.

The use of Voice response systems or units (VRU) has become a part of everyday life for a long time now for most people and is used by call centers for most companies including banks, financial institutions, hotels and various service oriented companies. Most, if not all, VRUs present the user with a series of "voice menus" and prompt the user to select an option or say some pre-defined text in order to proceed to the next step. There could be several steps including the need to authenticate the user for transaction based voice response systems. In many VRUs, the user has to wait to hear all the options before they can proceed to the next step(s). This is far more time consuming than navigating a list of similar options presented on an input screen on the web. Moreover, the user may not remember the options correctly after having to wait to hear all of the options.

SUMMARY OF THE INVENTION

According to one aspect of the invention, there is an interactive voice response system provided. The interactive voice response system includes a voice response platform that receives incoming calls and provide an interactive voice response service to a calling party. A mobile application executes on a processor that issues a call to the voice response platform. The voice response platform determines whether or not the calling party is using a mobile device. If a mobile device is being used, the voice response platform sends a translation of a voice menu back to the mobile device to be displayed as a visual representation of a voice menu on the mobile device.

According to another aspect of the invention, there is another method of providing an interactive voice response service. This method includes providing a voice response platform that receives incoming calls and provide an interactive voice response service to a calling party. This service menu would already be present in the mobile device for each provider. The presence of the voice response menu on the mobile device negates the need for constant communication with the IVR server and subsequent translation of the voice menu to a visual GUI on the mobile device. Also, the method includes issuing a call to the voice response platform using a mobile application. Furthermore, the method includes determining whether or not the calling party is a mobile device, and if so, the voice response platform sends a translation of a voice menu back to the mobile device to be displayed as a visual representation of a voice menu on the mobile device.

DETAILED DESCRIPTION OF THE INVENTION

The invention involves a novel voice response system or unit (VRU) providing user options via a graphical user interface on a mobile device that mimics the voice response menu. The benefits could lead to better user satisfaction and increasing user productivity when interacting with VRU based systems.

Various embodiments of the disclosure now will be described more fully with reference to the accompanying drawings. Embodiments may be in many different forms and should not be construed as limited to embodiments set forth herein; rather, these embodiments are intended to convey the scope of the disclosure to those skilled in the art. Furthermore, all "examples" given herein are intended to be non-limiting.

Figure 1:
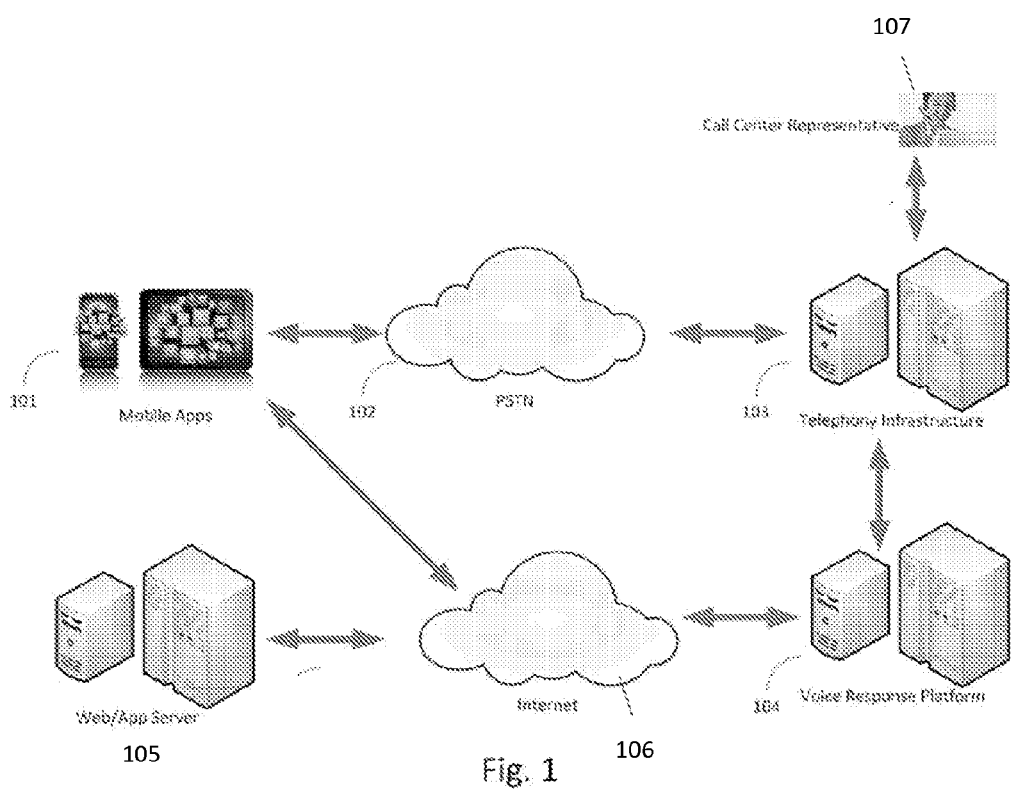
FIG. 1 is a schematic diagram illustrating the architecture and layout of the different components involved in a voice response system using a mobile app.

Referring now to FIG. 1, shown is a block diagram of one embodiment, among others, of the present disclosure. In this embodiment a calling party 101 includes a standard mobile device (a smartphone or a tablet, for example) used to make a call to a call center. In one embodiment, among others, one of the services can include a call center provided by the telephone service provider. A call center may include a VRS which queries the caller, receives feedback, and routes the call to the appropriate call service representative. The mobile device makes a connection to the PSTN 102 and the call is connected to the Telephony infrastructure 103. In one embodiment of the present invention, the VRS could be a web integrated Voice Response Platform (VRP) 104. The VRP 104 can receive incoming calls and provide an interactive voice response service to the calling party. When an incoming call is received, the web integrated VRP 104 can query a web or application server 105 to determine whether or not the calling party has a smart (or mobile) device. If so, the VRP 104 can send a translation of the voice menu back to the mobile device 101 to be displayed as a visual representation of the voice menu on the smart (mobile) device via the Internet 106.

When the VRP receives a notification signifying that the calling party has an accessible mobile network connection, the VRP can send a pre-recorded voice prompt to the calling party phone 101. The prompt can include a message indicating that there is a menu system is available in either voice menu format or a graphical user interface (GUI) format. Further, the GUI format can automatically be pushed to mobile device to facilitate user interaction with the VRP 104.

The VRP can then request that the calling party choose to continue with the voice menu format or transfer to the GUI format. If the party chooses the voice menu format, a series of pre-recorded voice menus are sent to the calling party mobile device [location 101].

However, if the calling party chooses to receive the GUI format, the VRP 104 contacts the web server 105. The VRP 104 notifies the web server that the calling party has requested the GUI format. The VRP 104 can supply the web server with the network address of the calling party mobile device, or alternatively, the web server itself can retrieve the network address of the calling party mobile device.

In alternative embodiments, the web server could "push" a web page to the calling party mobile device or send a universal resource locator (URL) to the calling party mobile device. Pushing the web page to the calling party mobile device can be performed in a number of ways including a "webcasting" application residing on the calling party mobile device, for example.

In an alternative embodiment, among others, the VRP 104 can include a system to collect information from the user via the GUI format, and connect the calling party telephone 101 to the correct party. This could be done by compiling a database according to the calling party's responses to a series of questions posed by the GUI and answers received by the web server. The web server, after collecting the information, could decide who the calling party should be connected to and notify the voice response system to connect a call to the desired party or service representative 107 via a the PSTN 102 through the switching system.

Alternatively, the web server 105 could notify the VRP 104 of the responses to the questions posed. The VRP 104 could then decide the correct disposal of the call and notify the telephony infrastructure 103. The telephony infrastructure 103 could then instruct the switching system 102 to perform the operation.

In alternative embodiments, the calling party 101 can save the URL corresponding to the GUI format menu and use the URL at a later date. Further, after receiving the calling party's responses to the GUI format menu, the VRP 104 can optionally connect the calling party with the desired called party or service representative 107 via a network phone or standard analog phone.

Figure 2:
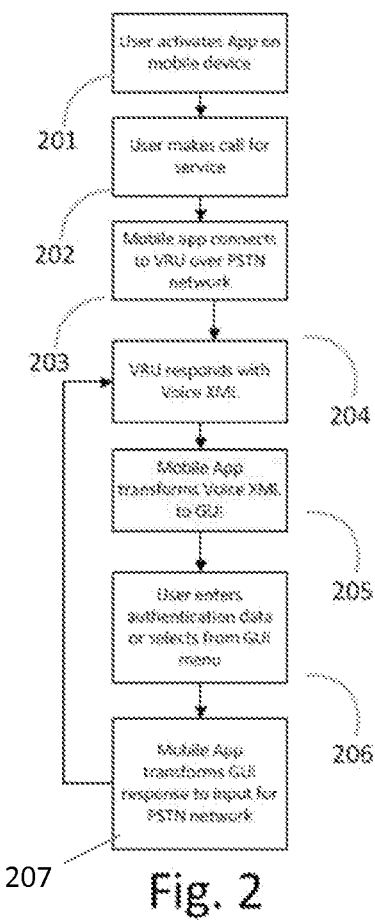
FIG. 2 is a process flow illustrating the steps in responding either with a voice menu or a mobile app menu for a voice call.

Referring now to FIG. 2, shown is a flowchart illustrating one embodiment, among others, of a call now using the system of FIG. 1. The user activates the mobile app, as shown in step 201 which is designed for the service provider (for example, a retail bank). The user then make a call, as shown in step 202, to the service provider's VRP 104 via the PSTN 102 and the Telephony Infrastructure 103 and connects, as shown in step 203. The VRP (or VRU) 104 responds with the voice response XML, as shown in step 204, which is then transformed into a GUI app page on the mobile device, as shown in step 205. The transformation could be performed within the mobile app by converting the voice XML to an HTML page (the GUI) using standard XSLT (Extensible Stylesheet Language Transformations) transformation techniques. The user is then prompted for authentication credentials and/or prompted for some input based on a set of selection criteria that is presented on the GUI page, as shown in step 206. User enters authentication credentials or a selection from the GUI and the mobile app can now send the data to the VRP via the PSTN network, as shown in step 207.

Figure 3:
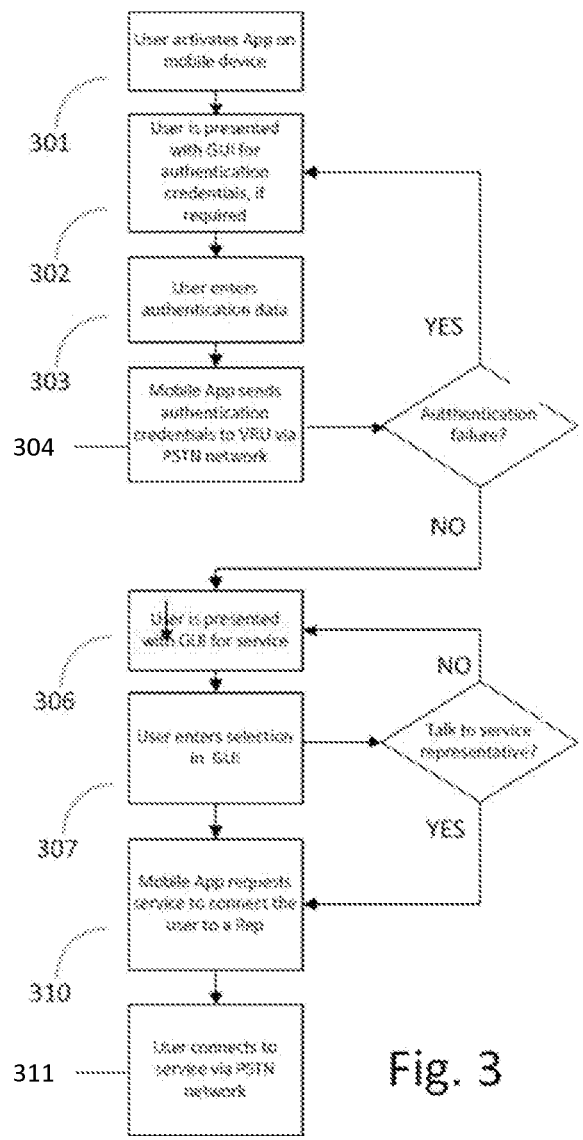
FIG. 3 is a process flow illustrating a different variation of the process flow shown in FIG. 2 where the mobile app has pre-loaded the GUI version of the voice menus for the service that the app is designed.

In another embodiment, FIG. 3 shows a different variation of the flow where the mobile app has pre-loaded the GUI version of the voice menus for the service that the app is designed. The user activates the mobile app, as shown in step 301, and the app presents the starting page for the GUI that represents the starting point of the voice menu for the service, as shown in step 302. User enters authentication credentials (if required) as shown in step 303, and the mobile app sends the credentials to the VRP/VRU for authentication via the PSTN network, as shown in step 304. If there is a failure in authentication, the GUI menu is presented to the user again in step 302. If the credentials are properly authenticated, the VRP notifies the mobile app and the app will present the next page of the GUI that represents the second page of the voice menu, as shown in step 306.

The user is presented with a menu of selections, as shown in step 306, and the user makes the appropriate selection and the mobile app responds with the next page of the GUI menu, as shown in step 307. As long as the user makes a selection to continue with the GUI menu pages and not talk to a representative and returns to step 306 and the control stays within the mobile app which will present subsequent pages of the GUI menu. If the user makes a selection to talk to a representative, as shown in step 310, the mobile make the appropriate request to connect to the Rep via the PSTN network, as shown in step 311.

Figure 4:
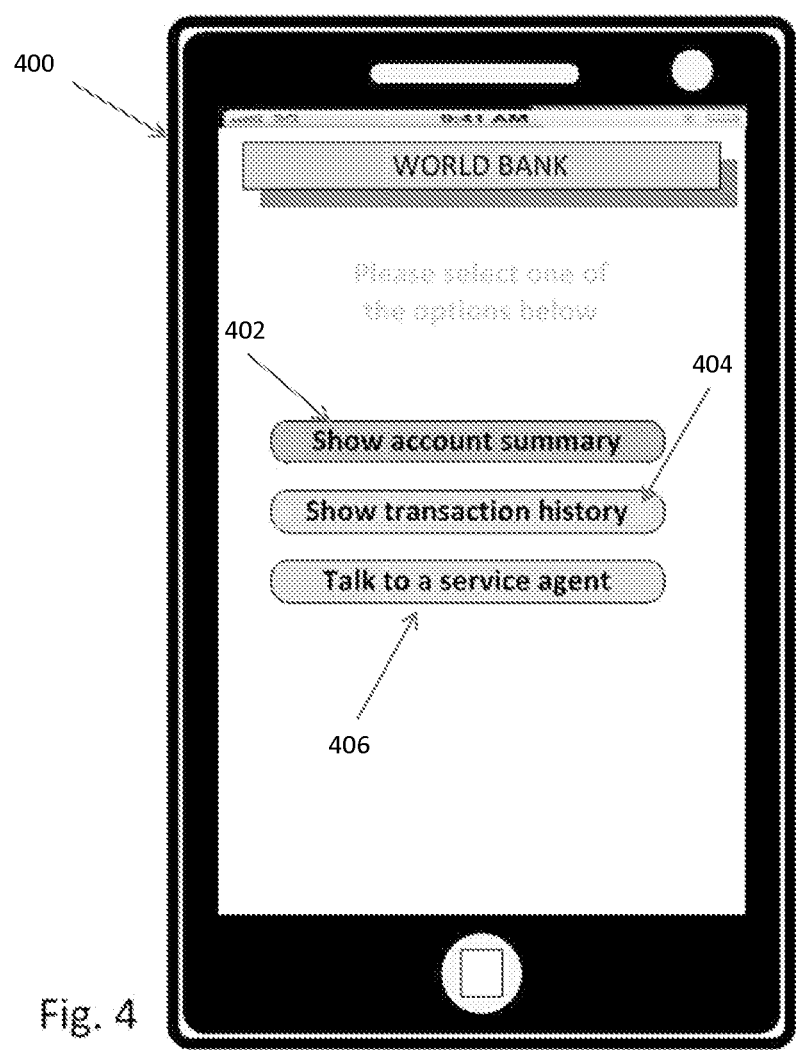
FIG. 4 is a schematic diagram illustrating an example of a screen menu for a mobile app when a call is in progress.

FIG. 4 shows a simple representation of the GUI used in accordance with the invention. The GUI includes various options that a user can select. This GUI is presented to the user from the mobile app in different ways. In one embodiment, the voice XML coming back from the IVR is transformed into the GUI. In another embodiment, the GUI representation of the same voice XML is already stored in the mobile app and the app has to simply transform the stored form into the HTML rendered in the GUI for the app. Note if a user selects button 402 the PTSN provides to the mobile device 400 an account summary to the user. The same occurs when a user selects button 404, the user's transaction history is provided. When a user selects button 406 a call is sent to a service agent. At this point, the user is connected to the service agent via the PSTN network.

The invention provides an interactive voice response system or unit (VRU) allowing users to select one or more options via a graphical user interface on a mobile device that mimics the voice response menu. The invention performs this task transparently and efficiently The benefits could lead to better user satisfaction and increasing user productivity when interacting with VRU based systems.

Although the present invention has been shown and described with respect to several preferred embodiments thereof, various changes, omissions and additions to the form and detail thereof, may he made therein, without departing from the spirit and scope of the invention.

What is claimed is:

1. An interactive voice response system comprising:
   a voice response platform that receives incoming calls and provide an interactive voice response service to a calling party; and
   a mobile application executing on a processor that issues a call to the voice response platform, the voice response platform determines whether or not the calling party is using a mobile device, and if so a pre-recorded voice prompt is sent to the calling party indicating that there is a menu system available in either a voice menu format or a graphical user interface (GUI) format, if the calling party selects the GUI format, the voice response platform assists in sending a translation of a voice menu back to the mobile device to be displayed in the GUI format as a visual representation of the voice menu on the mobile device, the translation of the voice menu is stored in a web server and the voice response platform requests the web server to send to the calling party the translation of the voice menu when the calling party selects the GUI format, the translation of the voice menu is transformed into the GUI format by the mobile application executing on the mobile device.

2. The interactive voice response system of claim 1, wherein the mobile application comprises a general user interface (GUI).

3. The interactive voice response system of claim 1, wherein the mobile application checks for an accessible network connection for the mobile device.

4. The interactive voice response system of claim 1, wherein the voice response platform pushes a web page or a graphical user interface (GUI) format to the mobile device based upon the mobile device address.

5. The interactive voice response system of claim 4, wherein the GUI comprised customizable information being maintained in a profile database of a user.

6. The interactive voice response system of claim 1, wherein the mobile application is activated once a user provides authentication information.

7. The interactive voice response system of claim 2, wherein the GUI matches the information provided in a voice menu format.

8. A method of providing an interactive voice response service comprising:
providing a voice response platform that receives incoming calls and provide an interactive voice response service to a calling party;
issuing a call to the voice response platform using a mobile application; and
determining whether or not the calling party is using a mobile device, and if so, a pre-recorded voice prompt is sent to the calling party indicating that there is a menu system available in either a voice menu format or a graphical user interface (GUI) format, if the calling party selects the GUI format, the voice response platform assists in sending a translation of a voice menu back to the mobile device to be displayed in the GUI format as a visual representation of a voice menu on the mobile device, the translation of the voice menu is stored in a web server and the voice response platform requests the web server to send to the calling party the translation of the voice menu when the calling party selects the GUI format, the translation of the voice menu is transformed into the GUI format by the mobile application executing on the mobile device.

9. The method of claim 8, wherein the mobile application comprises a general user interface (GUI).

10. The method of claim 8, wherein the mobile application checks for an accessible network connection for the mobile device.

11. The method of claim 8, wherein the voice response platform pushes a web page or a graphical user interface (GUI) format to the mobile device based upon the mobile device address.

12. The method of claim 11, wherein the GUI comprised customizable information being maintained in a profile database of a user.

13. The method of claim 8, wherein the mobile application is activated once a user provides authentication information.

14. The method of claim 9, wherein the GUI matches the information provided in a voice menu format.

* * * * *